United States Patent
Schmidt

(10) Patent No.: US 9,442,527 B2
(45) Date of Patent: Sep. 13, 2016

(54) DOCKING AND UNDOCKING MECHANISM FOR REMOTE DEVICES

(71) Applicants: VOLKSWAGEN AG, Wolfsburg (DE); AUDI AG, Ingolstadt (DE)

(72) Inventor: Norwin Schmidt, Sylt (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 452 days.

(21) Appl. No.: 14/185,666

(22) Filed: Feb. 20, 2014

(65) Prior Publication Data

US 2015/0234427 A1 Aug. 20, 2015

(51) Int. Cl.
*G06F 1/16* (2006.01)
*G01S 17/93* (2006.01)
*G01S 13/93* (2006.01)

(52) U.S. Cl.
CPC ............ *G06F 1/1632* (2013.01); *G01S 13/93* (2013.01); *G01S 17/93* (2013.01)

(58) Field of Classification Search
CPC ...... G06F 1/1632; G06F 13/00; H01R 11/30
USPC ............................ 403/39; 710/303, 8, 62, 72
See application file for complete search history.

(56) References Cited

U.S. PATENT DOCUMENTS

| | | | |
|---|---|---|---|
| 5,940,767 A * | 8/1999 | Bourgeois | H04M 1/04 455/349 |
| 6,305,656 B1 | 10/2001 | Wemyss | |
| 6,441,512 B1 * | 8/2002 | Jakel | E05B 77/48 307/10.2 |
| 6,532,447 B1 * | 3/2003 | Christensson | H04M 1/271 327/517 |
| 8,398,155 B2 | 3/2013 | Andochick | |
| 2004/0209489 A1 * | 10/2004 | Clapper | H01R 13/6205 439/39 |
| 2008/0079902 A1 * | 4/2008 | Mandelstam-Manor | A61B 3/0091 351/222 |
| 2013/0295908 A1 * | 11/2013 | Zeinstra | H04W 4/046 455/418 |
| 2014/0053185 A1 * | 2/2014 | Bleacher | H04N 21/41422 725/26 |
| 2015/0149968 A1 * | 5/2015 | Sun | G06F 3/04883 715/863 |
| 2015/0257158 A1 * | 9/2015 | Jadhav | H04B 1/04 455/404.1 |
| 2016/0149597 A1 * | 5/2016 | Takasu | H04B 1/04 455/127.2 |

FOREIGN PATENT DOCUMENTS

WO 2013074897 A1 5/2013

* cited by examiner

*Primary Examiner* — Christopher Shin
(74) *Attorney, Agent, or Firm* — Barnes & Thornburg LLP

(57) ABSTRACT

Apparatus, system and method for docking and/or undocking a remote device, A docking body includes a docking cavity and an access cavity, for providing lateral support, guidance and access for the remote device. Communications is configured to receive a control signal based on a sensed condition, wherein the sensed condition may include a proximity and/or position of a user's hand relative to the docking body, and/or an operating parameter of a vehicle. A coupling apparatus is provided for magnetically coupling the body of the remote device to at least a portion of the docking body. The coupling apparatus may be configured to modify the strength of the magnetic coupling based on the control signal to assist in insertion/removal. Under illustrative configurations, the docking body and the coupling apparatus allow for oblique insertion and oblique removal of the body of the remote device.

22 Claims, 4 Drawing Sheets

DOCKING AND UNDOCKING MECHANISM FOR REMOTE DEVICES

BACKGROUND

The present disclosure is directed to improved docking and undocking mechanisms for remote devices. More specifically, the present disclosure is directed to docking and undocking mechanisms for remote devices, such as touch pads (or "touch boards"), keyboards and other suitable devices configured to be securely attached to, and removed from, a fixture in a vehicle cabin, such as a center console, an armrest or armrest extension.

The use of touch-based surfaces as part of a vehicle's electronic system has grown in popularity over recent years. Originally popularized on laptops, touch pads became a powerful tool for navigating through computer-based operating systems and GUI-based applications. As touch screen technology for computers and portable computers developed, tactile-based interfaces have become highly sought-after features by users. Touch-screen interfaces for items such as GPS systems and automotive entertainment systems are popular features and are enjoyed by millions of user.

Conventional tactile-based surfaces, such as touch screens, have the drawback of needing to be located in or near the dashboard in order to allow a user to see and interface with the surface. This typically requires a user, such as a driver or passenger, to perform an extended reach to be able to touch the screen. Recently, automotive manufacturers have researched the use of controllers, such as joysticks or touch pads, to be positioned nearer to the driver in order to shorten the reach for interfacing with vehicle electronics.

More recently, automotive manufacturers have researched the use of removable keypads, in order to allow the keypad to be drawn even closer to a user in a non-driving condition, or shared with other passengers in the vehicle, allowing them to interface with vehicle electronics from a distance. However, the docking mechanisms used for securing the keypad to the dashboard or center console have been somewhat crude, and rely on conventional mechanical latching to hold the keypad in place. While the mechanical latches, which typically comprise plastic or metal fasteners, snaps, tangs, fingers, and the like, are good at securing keypads into a docking base, they are awkward for inserting, and especially awkward for removing the keypads from the face of the dashboard or console.

SUMMARY

According to the present disclosure, a docking and undocking mechanism is disclosed for elegantly inserting and removing a remote device, such as a keypad or touch pad, using an oblique motion. Under one exemplary embodiment, a systems and apparatuses are disclosed for securing a remote device, which include a docking body having a docking cavity comprising a docking recess configured to receive a body of the remote device. The docking body further includes an access cavity, positioned within the docking cavity, wherein the access cavity comprises an access recess that partially overlaps an area in the docking recess configured to receive the body of the remote device. The access cavity is configured to advantageously provide an area for a user's hand to insert and/or remove the remote device from the docking station. The systems and apparatuses may further include communications configured to receive a control signal based on a sensed condition, wherein the sensed condition may include a proximity and/or position of a user's hand relative to the docking body, and/or an operating parameter of a vehicle. The control signal may be generated or based on the sensed condition meeting or exceeding a predetermined parameter. Furthermore, the systems and apparatuses include a coupling apparatus for magnetically coupling the body of the remote device to at least a portion of the docking body. The coupling apparatus may be configured to modify the strength of the magnetic coupling based on the control signal to assist in insertion/removal. Under illustrative configurations, the docking body and the coupling apparatus allow for oblique insertion and oblique removal of the body of the remote device.

In other illustrative embodiments, methods are disclosed for operating a docking station. Illustrative methods comprise the steps of applying a first magnetic force in a connector in the docking station, wherein the connector is configured to magnetically couple with a remote device connector. Using a sensor, it is determined if a user's hand is within a predetermined proximity to the docking station, wherein a second magnetic force is applied in the connector if the determining step determines that the user's hand is within the predetermined proximity. In one illustrative embodiment, the first and second magnetic forces may be applied using electromagnetic force, wherein the second magnetic force may be smaller than the first magnetic force. In another illustrative embodiment, the connector comprises a permanent magnet, where the second magnetic force is applied in the opposite or opposing direction of the first magnetic force provided by the permanent magnet.

BRIEF DESCRIPTION OF THE FIGURES

The present invention is illustrated by way of example and not limitation in the figures of the accompanying drawings, in which like references indicate similar elements and in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
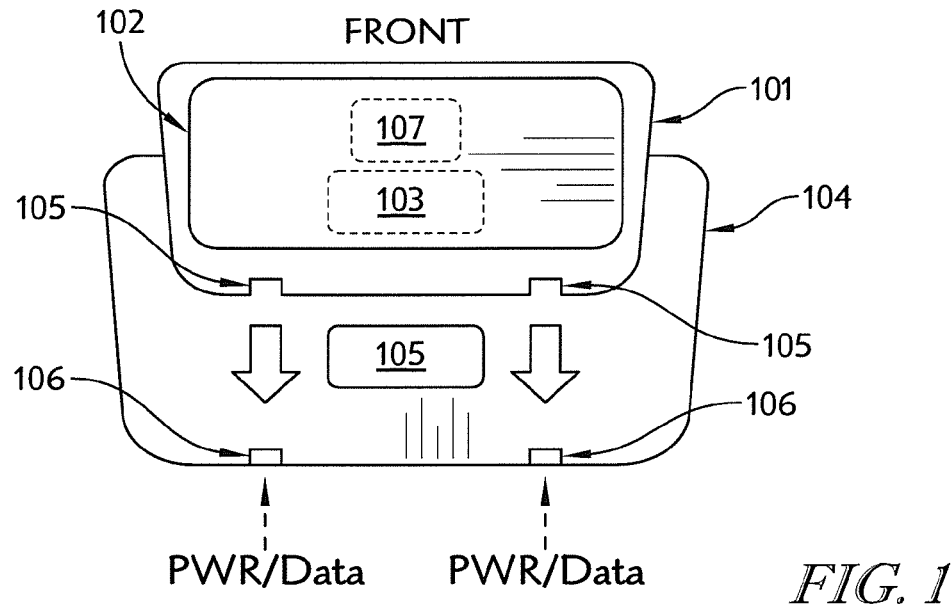
FIG. 1 illustrates a touch pad and docking station arrangement under an exemplary embodiment, where the touch pad is configured to be insertably mated into the docking station.

Turning to FIG. 1, an exemplary embodiment is shown with a docking station 104 configured to receive touch pad 101 generally in the direction shown by the arrows. It should be understood by those skilled in the art that the term "touch pad" as used herein refers to any remote device configured to receive tactile inputs, and may comprise a membrane keyboard, dome-switch keyboard, scissor-switch keyboard, capacitive keyboard, mechanical-switch keyboard, buckling-spring keyboard, hall-effect keyboard, laser keyboard, optical keyboard, joystick, trackball, track pad, a touch-based surface comprising resistive elements, SAW (surface acoustic wave) elements capacitive elements, surface capacitance elements, projected capacitance elements, infrared grid elements, optical imaging elements, dispersive signal technology elements, acoustic pulse recognition elements, or any suitable combination thereof.

In one exemplary embodiment, touch pad 101 comprises an input area 102 in which the entire area is configured to receive tactile input. In one exemplary embodiment, input area 102 comprises a matrix of sensors comprising a series of conductors arranged in an array of parallel lines in multiple layers, separated by an insulator and crossing each other at right angles to form a grid. A high frequency signal is applied sequentially between pairs in this two-dimensional grid array. The current that passes between the nodes is proportional to the capacitance. When a virtual ground, such as a finger, is placed over one of the intersections between the conductive layer some of the electrical field is shunted to this ground point, resulting in a change in the apparent capacitance at that location. In another exemplary embodiment, input area 102 comprises capacitive shunt sensor arrangement that senses the change in capacitance between a transmitter and receiver that are on opposite sides of the sensor. A transmitter creates an electric field which oscillates approximately at 200-300 kHz. If a ground point, such as a finger, is placed between the transmitter and receiver, some of the field lines are shunted away, decreasing the apparent capacitance. By creating a larger input area 102 for receiving tactile inputs, users will have a more convenient manner in which they can provide inputs. It should be understood by those skilled in the art that other techniques, described above, for providing tactile inputs to input area 102 are envisioned by the present disclosure as well, including combinations thereof (e.g., a capacitive touch surface, joystick and mechanical-switch keypad). Additionally, other peripheral devices may be incorporated into touch pad 101, including batteries, speakers, lighting, microphone, displays, and the like.

In one exemplary embodiment, touch pad 101 comprises an inductive charger receiver 103, which may charge touch pad 101 utilizing wireless power transmissions (WPT). WPT is the efficient transmission of electric power from one point to another trough vacuum or an atmosphere without the use of wire or any other substance. Inductive charging uses the electromagnetic field to transfer energy between two objects. Charging station 105, positioned in docking station 104, sends energy through inductive coupling to touch pad 101 via receiver 103, which stores the energy in the batteries. Because there is a small gap between the two coils, inductive charging may be considered a kind of short-distance wireless energy transfer. Induction chargers typically use an induction coil (105) to create an alternating electromagnetic field from within the docking station 104, and a second induction coil (103) in the touch pad takes power from the electromagnetic field and converts it back into electrical current to charge the battery. The two induction coils in proximity combine to form an electrical transformer. Inductive charging is advantageous in that it carries a far lower risk of electrical shock, when compared with conductive charging, because there are no exposed conductors. The ability to fully enclose the charging connection also makes the approach attractive where water resistance or impermeability is required (e.g., resistant to fluid spills from a user or passenger). Inductive charging makes charging touch pad 101 more convenient rather than having to connect a power cable, the unit can be placed on or close to a charge plate (105).

Touch pad 101 may further comprise communication circuitry 107 to allow touch pad 101 to communicate wirelessly with a vehicle and/or with other devices, such as smart phones, tables, laptops, etc. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

In an alternate embodiment, touch pad 101 may be provided with power and/or data communication via connectors 106 in docking station 104. As coupling connectors 105 of touch pad 101 come into contact with connectors 106 of docking station 104, power is immediately supplied to touch pad 101. Additionally, any data communication to/from the vehicle may take place when connectors 105, 106 come into contact.

Figure 2:
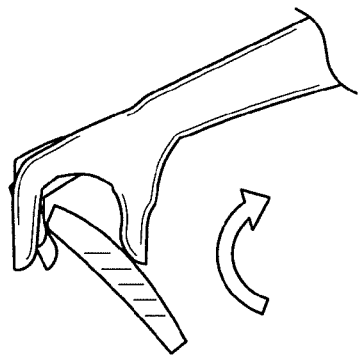
FIG. 2 illustrates an exemplary oblique motion, carried out by a user, for removing a touch pad from the docking station under the present disclosure.

As will be described in further detail below, the docking arrangement and connectors are uniquely configured to draw touch pad 101 into a secure mate with docking station 104. The mating or docking arrangement provides a unique configuration where touch pad is secured while allowing users to insert and remove a touch pad using an oblique motion as shown in FIG. 2. Such a docking arrangement addresses at least some of the drawbacks of conventional docking that requires a linear insertion and removal of a touch pad or other devices. Furthermore, as the connectors 106 fasten to a back portion of the touch pad, this further assists in oblique removal, as the holding force of connectors 105, 106 is lateral to the removal force and not directly opposing it. Moreover, the positioning allows connectors to be configured to secure touch tab 101 against forces coextending along the side of the device, away from the connectors. This is particularly advantageous in preventing an unwanted ejection when a vehicle comes to a sudden stop.

Figure 3:
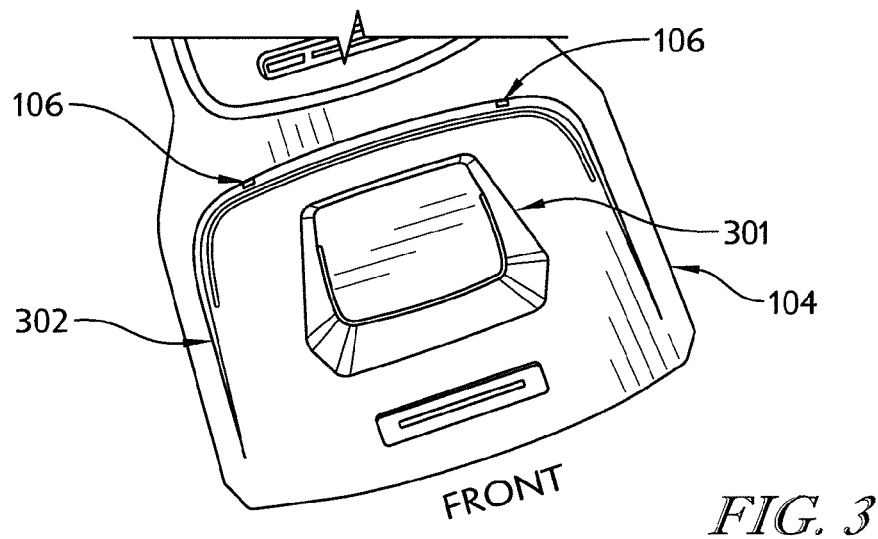
FIG. 3 illustrates the docking station of FIG. 1 under an exemplary embodiment.

Turning to FIG. 3, an exemplary embodiment is illustrated of a docking station, which may be manufactured using any variety of rigid or semi-rigid material, such as plastic. This embodiment shows a docking area for the station, comprising a docking cavity 302, configured to receive the body of a touch pad. Docking cavity 302 is illustratively embodied as a gradated recess, which advantageously assists a touch pad for oblique insertion while providing sufficient lateral support. Access cavity 301 advantageously provides an open area for a user's hand when inserting/removing a touch pad. Similar to docking cavity 302, access cavity 301 may be embodied as a gradated recess.

Figure 4:
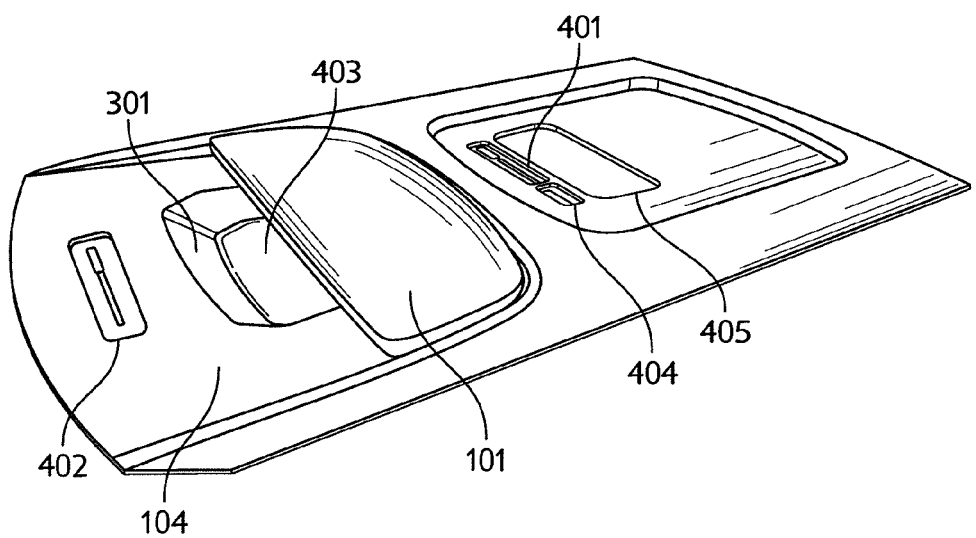
FIG. 4 illustrates a mated docking station assembly comprising a docked touch pad, separate volume control, gesture control, and status lights under one exemplary embodiment

FIG. 4 illustrates a mated docking station assembly under one exemplary embodiment, where touchpad 101 is in a mated position with docking station 104. As can be seen from the figure, the gradated recess of docking cavity 302 allows touch pad 101 to be mated in a manner where the back end of touch pad 101 is substantially flush with the assembly surface, which functionally and ergonomically provides an obstruction-free surface. At the same time, access cavity 301 still allows a user to easily access and grasp touch pad 101 for removal.

As can be seen in the figure, docking station assembly further comprises a volume control 402, which may be manufactured from touch-sensitive (tactile) materials and associated circuitry, discussed above. Additionally, a lighting frame 403 may be provided as shown, which may be advantageous in providing visual indicia to a user that touch pad 101 is properly docked. A gesture control module 401 may be provided to allow the docking station to intuitively release forces in the connectors, based on proximity of a user's hand to the touchpad. Further details regarding this feature will be discussed in greater detail below in connection with FIG. 6. Status lights 404 may be provided to indicate an operating status for sensor 401.

Figure 5:
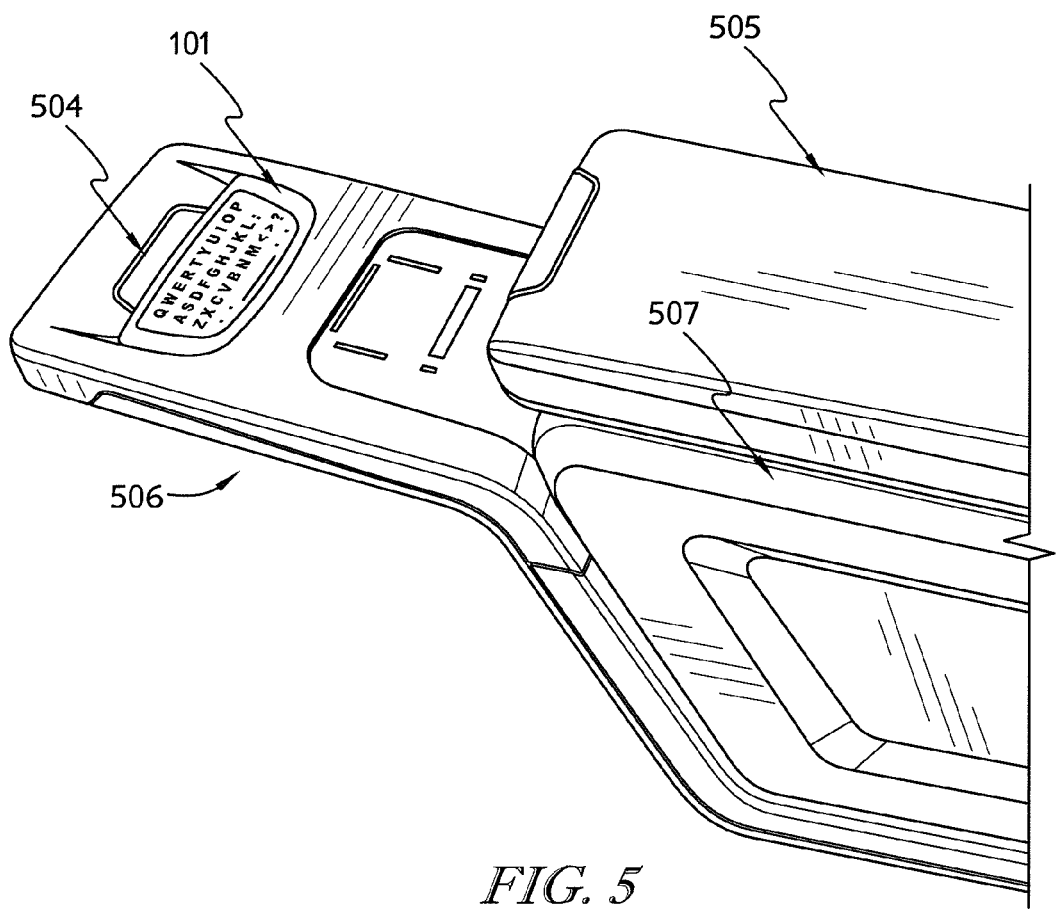
FIG. 5 illustrates another mated docking station assembly integrated into a driver's arm rest assembly under one exemplary embodiment.

Turning to FIG. 5, another exemplary embodiment is provided, where a docking station assembly 506 is integrated into an armrest assembly 507, comprising an arm rest 505. As can be seen from the figure, the docking configuration for touch pad 101 conveniently positions touch pad 101 in a non-obtrusive manner, conveniently within the reach of a driver or passenger. Similar to FIGS. 3-4, access cavity 504 provides a convenient arrangement for physically grasping (and inserting) touch pad 101 with a human hand. Furthermore, as can be observed from FIG. 5, touch pad 101 is illustrated as a keyboard in this embodiment. Such an arrangement may be advantageous for entering addresses for a vehicle GPS system without needing to reach over to a dashboard or console for data entry.

Figure 6:
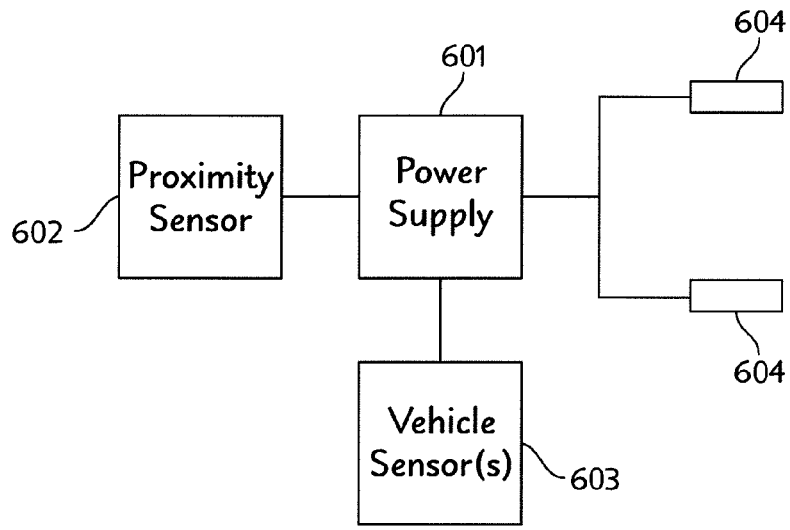
FIG. 6 illustrates a block diagram of docking connector circuitry controlled by vehicle sensors and a proximity sensor under one exemplary embodiment.

Turning to FIG. 6, an exemplary embodiment is provided for providing a unique and secure connection between connectors of a touch pad (105) and docking station (106). Connectors 604 may be connectors 106, discussed above in FIG. 1 under one embodiment. These connectors may be magnetized in order to provide a more secure connection with the mating connectors (105). Utilizing permanent magnets for connectors 604 allows a docking station to provide magnetic guidance, in addition to the mechanical guidance provided by the docking cavity, to the docking process. In this embodiment, connectors 604 may be manufactured from any material that is magnetized (ferromagnetic) and creates its own persistent magnetic field. Examples include iron, nickel and cobalt. Ferromagnetic materials can be divided into magnetically "soft" materials like annealed iron, which can be magnetized but do not tend to stay magnetized and magnetically "hard" materials, which do. Connectors 604 may be permanent magnets made from "hard" ferromagnetic materials such as alnico and ferrite that are subjected to special processing in a powerful magnetic field during manufacture, to align their internal microcrystalline structure, making them very hard to demagnetize.

In another embodiment, connectors 604 are part of an electromagnetic circuit, powered by power supply 601. Here, connectors 604 may be made from a coil of wire that acts as a magnet when an electric current (provided from 601) passes through it but stops being a magnet when the current stops. The coil may be wrapped around a core of "soft" ferromagnetic material such as steel, in order to enhance the magnetic field produced by the coil. The electric currents from power supply 601 flows in the wire and create a magnetic field around the wire in connectors 604. To concentrate the magnetic field, the wire is wound into a coil with many turns of wire lying side by side. The magnetic field of all the turns of wire passes through the center of the coil, creating a strong magnetic field there. In one embodiment, the coil may be formed into a shape of a straight tube (helix), similar to a solenoid. Much stronger magnetic fields can be produced if a core of ferromagnetic material, such as soft iron, is placed inside the coil. The ferromagnetic core increases the magnetic field to thousands of times the strength of the field of the coil alone, due to the high magnetic permeability ($\mu$) of the ferromagnetic material.

Power for the electromagnetic connectors 604 is provided by power supply 601, which may be supplied by the vehicle batteries. Under one embodiment, power supply 601 is a stand-alone variable DC power supply, which may comprise a transformer, silicon diode bridge rectifier, reservoir capacitor arrangement, voltage regulator IC and a controller. If power supply 601 is configured to drive other circuitry (e.g., within docking station assembly), multiple voltage lines, variable regulators, power control lines, discrete circuits, etc. may be used. In this embodiment, power supply 601 may receive control signals from proximity sensor 602 and one or more vehicle sensors 603. Control signals from sensors 602, 603 control a current output from power supply 601 to connectors 604, which in turn would control the level of magnetic force exerted by connectors 604. If a permanent magnet is used, the configuration of the present disclosure may easily be changed such that connectors 604 are magnetized to provide force in the opposite direction of the touch pad connectors. Permanent magnets may be advantageous in that they would not require continuous power to retain their magnetic connection. Providing an opposing magnetic force in this embodiment has the same effect of reducing the overall magnetic force present in connectors 604.

In the example of FIG. 6, at least one control signal may be provided by proximity sensor 602. Proximity sensor 602 may be embodied as part of gesture control 401 of the docking station assembly, discussed above. As a user's hand approaches touch pad 101, proximity sensor produces signals based on the hand's physical proximity to touch pad 101. If these signals meet or exceed one or more threshold levels, proximity sensor 602 outputs a control signal to power supply, instructing it to lower current being supplied to connectors 604. As the lower current lowers the magnetic attraction between connectors 604 and the connectors of the touch pad, a user may advantageously remove touch pad 101 with reduced magnetic resistance. In one embodiment, proximity sensor 602 transmits a control signal under a single threshold level, which would indicate that a user's hand is near or distant from touch pad 101. In another embodiment, proximity sensor 602 would be operable under a multitude of threshold levels. As a hand approaches touch pad 101, the closing proximity would trigger multiple control signals instructing power supply to lessen the current at each threshold. Such an embodiment would be advantageous for minimizing "false positives" for a user's grasp, which may occur, for example, when the user's hand motions near touch pad 101 but is, in fact, reaching for, or motioning at, an object other than the touch pad. As before, the configuration may be changed in the case of permanent magnets to provide a control signal that would result in connectors 604 generating a repelling magnetic force for easing removal.

Proximity sensor 602 should be configured to sense motion in a limited predetermined area. In one embodiment, proximity sensor 602 may be configured as an optical proximity sensor comprising a transmitter and receiver. The transmitter may be an infrared (IR) source, such as an IR LED, which may be driven by the sensor itself or by a microcontroller, depending on the type of sensor and/or the design requirements. When active, the optical sensor detects the presence of objects using reflectance. The sensor drives the transmitter to illuminate an object, and measures the intensity of the reflected light on the receiver. Utilizing a microcontroller, the signal level output of the receiver may be read to determine whether an object is close, and further determine how close the object is. This configuration would be advantageous not only for proximity detection, but for gesture recognition as well.

Under one exemplary embodiment, the current provided to connectors 604 may be controlled by hand gestures, as well as proximity. Under another exemplary embodiment, a second transmitter may be used in proximity sensor 602, where the microcontroller could be used to switch between the two transmitters and read measurements for each. This way, a relative position (depth/distance) of an object parallel to the touch pad may be determined. In one embodiment, this process may be repeated over time and the composite output becomes a set of positions that can be converted into a motion pattern. In turn, one or several motion patterns may be used to form a gesture for the system. Utilizing a relatively fast sample rate, proximity sensor 602 may be configured to accurately capture and utilize numerous motions from users to control the strength of magnetic coupling provided by connectors 604. It should be understood by those skilled in the art that other types of proximity sensors (e.g., capacitive, inductive, ultrasonic, etc.) are contemplated by the present disclosure as well.

Continuing with the example of FIG. 6, one or more vehicle sensors 603 may similarly provide signals to power supply 601 for affecting the magnetic strength of connectors 604. In this embodiment, control signals from vehicle sensors 603 comprise any suitable sensor signal from the vehicle's engine control unit (ECU), braking system, and/or air bag sensor(s). This configuration is particularly advantageous for customizing the magnetic attraction of connectors 604 to the touch pad under various operating conditions of the vehicle meeting or exceeding a threshold. For example, vehicle sensor 603 may comprise an anti-lock brake system (ABS) sensor that provides a control signal when the ABS is deployed in a vehicle. In this embodiment, the deployment of the ABS is indicative of a hard braking condition, which in turn would cause moderate to heavy gravitational forces to be exerted on a docked touch pad. In order to counteract these forces, the control signal from sensor 603 would cause power supply 601 to increase the current for contacts 604 and apply greater magnetic attraction for the contact coupled with the touch pad. This would have the advantageous effect of providing a more secure magnetic connection. In one embodiment, the configuration of FIG. 6 may be arranged such that control signals from sensors 603 would take priority over control signals from proximity sensor 602.

Figure 7:
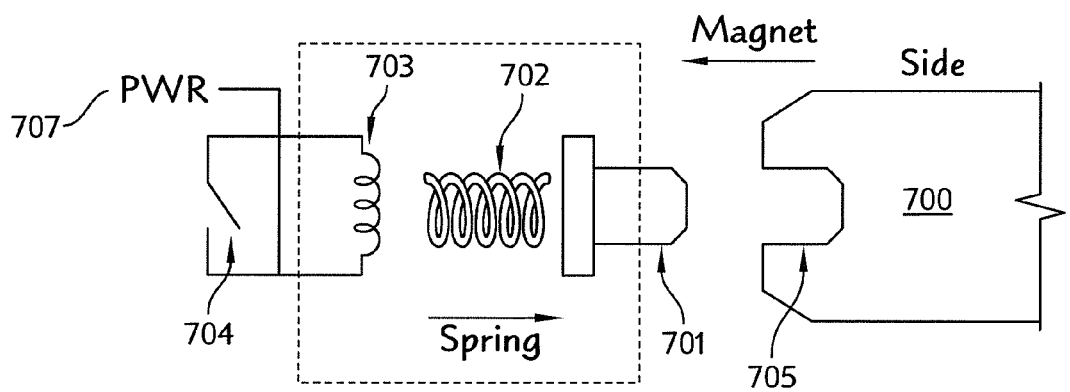
FIG. 7 illustrates a touch pad securing mechanism utilizing magnetic and spring forces for a securing bolt under one exemplary embodiment.

Additional touch pad security configurations are also possible under the present disclosure. Turning to FIG. 7, an exemplary embodiment is provided, where a securing bolt 701 is inserted into securing cavity 705 via spring 702. Similar to the connector embodiment in FIG. 6, securing bolt 701 is configured to magnetically or electromagnetically (via coil 703) couple to securing cavity 705, which includes a magnetic material or coating. Power for coil 703 may be provided via power supply 601. Here, mechanical spring 702 is provided for driving securing bolt 701 into the side of touch pad 101. Spring 702 may be integrated as part of coil 703, or may be isolated therefrom. In this embodiment, mechanical spring 702 is held in a tightly coiled position, and may be released via a latching mechanism or other suitable means upon receipt of a control signal (e.g., via vehicle sensor 603). In one embodiment, a sensor or switch 704 is provided in the vehicle and may be configured to activate a signal in the event of collision or potential collision.

Figure 7A:
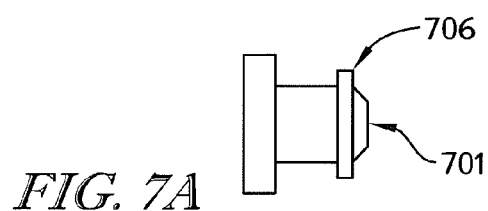
FIG. 7A illustrates a securing bolt comprising lateral extensions for providing additional security under one exemplary embodiment.

Sensor 704 may be configured as part of a collision avoidance system, and embodied as a radar or laser sensor. In the event sensor 704 senses an oncoming collision, current is increased to coil 703 to increase magnetic attraction, and the latching mechanism for spring 702 is released, causing bolt 701 to securely mate into securing cavity 705 of touch pad 101. Sensor 704 may also be embodied as a switch, where, once a collision occurs, sensor 704 may break contact, causing the latching mechanism for spring 702 to be released and drive bolt 701 into securing cavity 705. It can be seen from these examples that the configuration of FIG. 7 provides additional security to touch pad 101 by driving securing bolts into one or both sides of touch pad 101 during a catastrophic event (e.g., vehicle collision) and preventing touch pad 101 from releasing from a docking station and becoming a potential hazard to the occupants of a vehicle. For still further security, bolt 701 may be embodied with a securing gasket 706 as shown in FIG. 7A, which may be made from rubber, plastic or other suitable material. Here, securing gasket 706 provides a securing frictional force to the bolt 701/cavity 705 coupling.

Figure 8A:
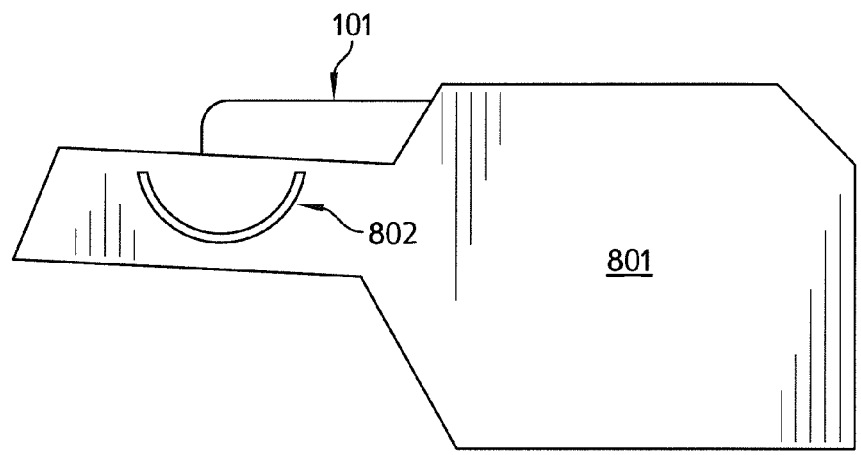
FIGS. 8A-C illustrate various touch pad securing mechanisms utilizing retractable barriers under various exemplary embodiments.
Figure 8B:
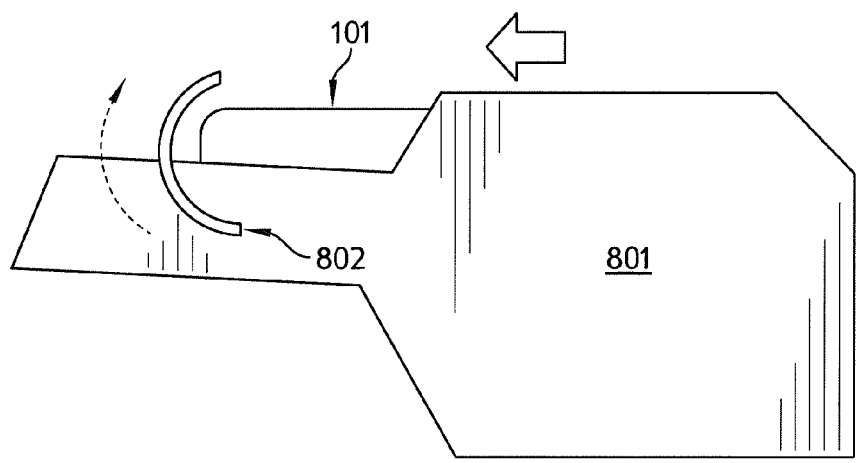
Figure 8C:
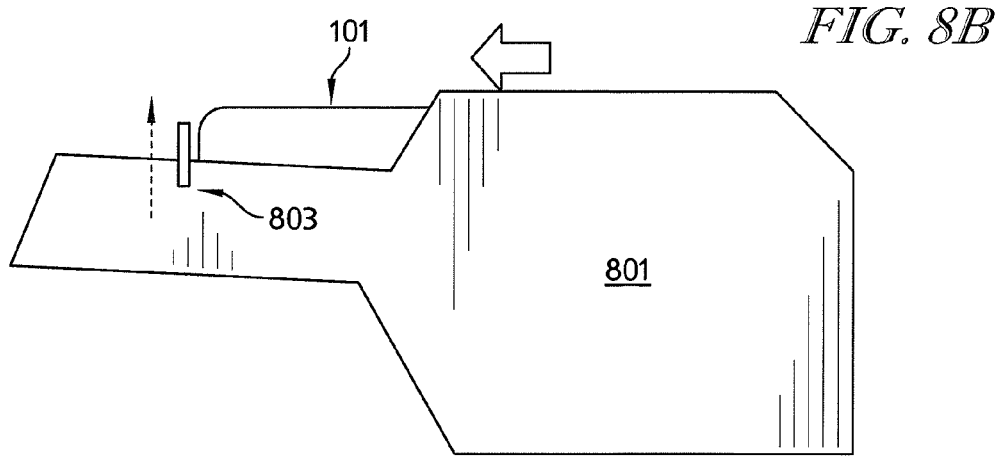

Still further touch pad security configurations are provided in FIGS. 8A-C, where touch pad 101 is shown mated in a docking station integrated into an armrest assembly 801 (see FIGS. 1 and 3-5). In the embodiment of FIG. 8A, a retractable touch pad barrier 802 is configured within assembly 801. Barrier 802 may be locked or latched into position by a spring assembly or other suitable means. Here, the touch pad barrier 802 is embodied as a curved arm, which, in a fully retracted position, is embedded within assembly 801 out of sight. Similar to the embodiment in FIG. 7, if a catastrophic event is sensed, a control signal is sent, which releases the spring assembly, causing barrier 802 to extend up along the curvature shown in FIG. 8B, and protecting the touch pad 101 from the foreword force depicted by the arrow in FIG. 8B. Similarly, FIG. 8C illustrates a touch pad barrier 803, embodied as a plate, which similarly ejects upward to protect touch pad 101 from releasing forward due to a collision force (depicted by arrow).

As can be appreciated by those skilled in the art, the present disclosure provides for the docking/undocking/securing of a remote device (touch pad) in a car, while providing recharging capability for the device and device status indication via LEDs. Under the present disclosure, driver attention for docking/undocking of the remote device is minimized. The user is able to pick up the device in the vehicle and execute any predefined operator control actions specified on the device. If the remote device is not needed anymore, the user can place the device near the docking station and the remote device automatically docks into the right position and can be removed very easily. Special undocking buttons are not necessary, and inserting/removing the device becomes simplified. In an autonomous driving mode of an autonomous vehicle, the remote device can be used as a text input or touch-gesture input device. In a transition from autonomous mode to manual driving mode, the user will be able to dock the device quickly so that it is restrained safely in the center console. The docking mechanism uses a geometric form approach and magnetic forces to guide the user with the device in the right direction and prevent a misplacement of the remote device.

When using electromagnets for additionally securing the device in the docking station the magnetic force may be triggered by the presence of the users hand in order to make the undocking easier (i.e., the magnetic force may be decreased as soon as the user's hand approaches). The presence of a user's hand near the device dock can be detected, for example with capacitive sensors, infrared sensors or a camera with image recognition for a user's hand. The remote device could be secured by permanent magnets in cooperation with magnetic material which holds the remote device securely in place. If the user's hand is detected, the magnetic forces of the permanent magnet could be reduced by an electromagnet producing an electromagnetic field opposite of the permanent magnet. By doing this, the user can grab the remote device easily without having to apply high tractive forces. Of course, controllable attractive electromagnetic forces may be used to accomplish this task as well. Using a permanent magnet helps to reduce the power consumption of the holding construction by applying magnetic forces without using electric current for a coil.

An inductive charging of the remote device can be provided separately in the construction or in combination with the electromagnets used to add or subtract electromagnet forces of the permanent magnets. The electromagnets may also be used for inductive charging, provided that a corresponding charging coil is placed in the remote device. The electromagnets may also be used to increase/decrease the electromagnetic force and provide charging at the same time by applying a DC current with an additional AC portion.

Additionally, in some driving situations the adhesion force can be increased, for example, when the user is not supposed or allowed to take the remote device because he is in a driving situation. Also, in the case of a catastrophic event (e.g., a crash or pre-crash situation) the magnetic forces can be increased in order for the device to stay in its position during a crash. A bolting security device may also be provided to secure the remote device in its position. If the user's hand approaches the remote device the physical security device can be unlocked.

Additional light indicators could also signal if the user is allowed in the corresponding driving situation to pick up the remote device. The indicators could permanently be lit or only when a hand is detected near the remote device. The indicators may be used to guide the user's hand to the correct area where a device is to be inserted and/or removed. Such a configuration may be advantageous in circumstances where the driver's cabin is dark or has reduced lighting/visibility. The permanent magnets could also serve as electrically conductive parts from the center console to the remote device. When the remote device is in its storage position, an electrically rechargeable energy source inside the remote device can be charged via the conductive magnet contacts.

In predefined driving situations the remote device and/or the vehicle could provide visual, audio and/or haptic information that the remote device needs to stored in its storage position. Such situations could include an upcoming driving mode change from autonomous to manual driving mode and the need to store the remote device or the end of driving, when the driver has reached his destination. At the destination the remote device may request to be stored in its storage space before the driver gets out of the vehicle. The present disclosure provides easy to use, safety and ergonomic aspects for a unique vehicle remote device.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for securing a remote device, comprising:
   a docking body comprising:
      a docking cavity, said docking cavity comprising a docking recess configured to receive a body of the remote device;
      an access cavity, positioned within the docking cavity, wherein the access cavity comprises an access recess that partially overlaps an area in the docking recess configured to receive the body of the remote device;
   communications, configured to receive a control signal based on a sensed condition, wherein the sensed condition comprises at least one of (i) a proximity of a user's hand to the docking body, and (ii) an operating parameter of a vehicle, and wherein the control signal is dependent upon the sensed condition meeting or exceeding a predetermined parameter; and
   coupling means for magnetically coupling the body of the remote device to at least a portion of the docking body, wherein the coupling means modifies the strength of the magnetic coupling based on the control signal, and wherein the docking body and the coupling means are configured to allow at least one of an oblique insertion and oblique removal of the body of the remote device.

2. The system of claim 1, wherein the docking recess and the access recess are gradated recesses.

3. The system of claim 1, further comprising a sensor apparatus operatively coupled to the communications, wherein the sensor apparatus is configured to determine the sensed condition.

4. The system of claim 3, wherein the sensor apparatus comprises at least one of an optical proximity sensor, a capacitive proximity sensor, an inductive proximity sensor and an ultrasonic proximity sensor.

5. The system of claim 3, wherein the sensor apparatus comprises a vehicle sensor.

6. The system of claim 1, further comprising at least one security bolt coupled to the communications and configured to be resiliently secured in the docking body, wherein the security bolt is further configured to release away from the docking body when another control signal is received.

7. The system of claim 6, wherein the security bolt comprises one of (i) a magnetic bolt and (ii) an electromagnetic bolt.

8. The system of claim 6, wherein the another control signal is based on another sensed condition comprising one of (i) another operating parameter of the vehicle and (ii) a collision sensor.

9. The system of claim 1, wherein the communications is configured to receive another control signal is based on another sensed condition comprising one of (i) another operating parameter of the vehicle and (ii) a collision sensor.

10. The system of claim 9, further comprising a retractable barrier near a front portion of the docking station, wherein the retractable barrier is configured to extend over the front portion of the docking station when the another control signal is received in the communications.

11. An apparatus for securing a remote device, comprising:
   a docking body comprising:
      a docking cavity, said docking cavity comprising a docking recess configured to receive a body of the remote device;
      an access cavity, positioned within the docking cavity, wherein the access cavity comprises an access recess that partially overlaps an area in the docking recess configured to receive the body of the remote device;
   communications, configured to receive a control signal based on a sensed condition, wherein the control signal is dependent upon the sensed condition meeting or exceeding a predetermined parameter; and
   a coupling apparatus, comprising at least one magnetic connector, said coupling apparatus being configured to couple the body of the remote device to at least a portion of the docking body, wherein the coupling apparatus is configured to modify the strength of the magnetic coupling based on the control signal.

12. The apparatus of claim 11, wherein the sensed condition comprises at least one of (i) a proximity of a user's hand to the docking body, and (ii) an operating parameter of a vehicle.

13. The apparatus of claim 11, wherein the docking recess and the access recess are gradated recesses.

14. The apparatus of claim 11, further comprising at least one sensor operatively coupled to the communications, wherein the at least one sensor is configured to determine the sensed condition.

15. The apparatus of claim 14, wherein the at least one sensor comprises at least one of an optical proximity sensor, a capacitive proximity sensor, an inductive proximity sensor, an ultrasonic proximity sensor and a vehicle sensor.

16. The apparatus of claim 11, further comprising at least one security bolt coupled to the communications and configured to be resiliently secured in the docking body, wherein the security bolt is further configured to release away from the docking body when another control signal is received.

17. The apparatus of claim 16, wherein the security bolt comprises one of (i) a magnetic bolt and (ii) an electromagnetic bolt.

18. The apparatus of claim 16, wherein the another control signal is based on another sensed condition comprising one of (i) another operating parameter of the vehicle and (ii) a collision sensor.

19. A method for operating a docking station, comprising the steps of:
   applying a first magnetic force in a connector in the docking station, wherein the connector is configured to magnetically couple with a remote device connector;
   determining, via a sensor, if a user's hand is within a predetermined proximity to the docking station; and
   applying a second magnetic force in the connector if the sensor determines that the user's hand is within the predetermined proximity.

20. The method of claim 19, wherein the second magnetic force is in the opposite direction of the first magnetic force.

21. The method of claim 19, wherein the first and second magnetic forces are applied using electromagnetic force, and wherein the second magnetic force is smaller than the first magnetic force.

22. The method of claim 19, further comprising the step of determining a relative position of the user's hand via the sensor.

* * * * *